United States Patent [19]
Hirasawa et al.

[11] Patent Number: 5,655,079
[45] Date of Patent: Aug. 5, 1997

[54] DATA PROCESSING SYSTEM AND DATA TRANSMISSION AND PROCESSING METHOD

[75] Inventors: Shigeki Hirasawa, Kawasaki; Kinji Mori, Machida; Masayuki Orimo, Kawasaki; Yuko Teranishi, Koganei; Masuyuki Takeuchi, Fujisawa; Hiroshi Fujise, Yokohama; Shoji Iwamoto, Owariasahi, all of Japan

[73] Assignee: Hitachi, Ltd., Tokyo, Japan

[21] Appl. No.: 447,080

[22] Filed: May 22, 1995

Related U.S. Application Data

[63] Continuation of Ser. No. 20,250, Feb. 18, 1993, abandoned, which is a continuation of Ser. No. 558,080, Jul. 25, 1990, abandoned.

[30] Foreign Application Priority Data

Jul. 31, 1989 [JP] Japan ..................... 1-198176
Sep. 4, 1989 [JP] Japan ..................... 1-228949

[51] Int. Cl.$^6$ ..................................... H04S 3/02
[52] U.S. Cl. ................... 395/200.01; 395/200.16; 395/800; 370/60; 370/94.1; 364/284; 364/DIG. 1
[58] Field of Search ......................... 395/800, 200, 395/200.01, 200.16; 370/60, 94.1; 364/284, DIG. 1

[56] References Cited

U.S. PATENT DOCUMENTS

| | | | |
|---|---|---|---|
| 4,354,267 | 10/1982 | Mori et al. | 371/11 |
| 4,366,479 | 12/1982 | Mori et al. | 370/86 |
| 4,462,075 | 7/1984 | Mori et al. | 364/200 |
| 4,477,881 | 10/1984 | Kobayashi et al. | 364/900 |
| 4,636,939 | 1/1987 | Fildes | 364/200 |
| 4,660,201 | 4/1987 | Nakamura | 364/200 |
| 4,661,951 | 4/1987 | Segarra | 370/85.9 |
| 4,729,090 | 3/1988 | Baba | 364/200 |

(List continued on next page.)

FOREIGN PATENT DOCUMENTS 59-47905  11/1984  Japan.

OTHER PUBLICATIONS

INTAP–S002–02 (V0,R1). This document is provided in Japanese. An English translation is unavailable to applicants' attorney.

Kim, et al., "Group Communication Mechanism for Dynamic Distributed Programs in UNIX Environment," Proceedings TENCON 87, vol. 2/3, Aug. 25, 1987, pp. 614–618. (English).

von Taube, Eugene. "Gateways Link Assorted Networks," Computer Design, vol. 24, No. 2, Feb. 1985, pp. 125–130. (English).

Liu, et al. "A Session Layer Design of a Reliable IPC System in the UNIX 4.2 Environment," Proceedings Computer Networking Symposium, Nov. 17, 1986, pp. 120–129. (English).

"Establishing Virtual Circuits in Large Computer Networks," IBM Technical Disclosure Bulletin, vol. 28, No. 8, Jan. 1986, pp. 3513–3517. (English).

Wolstenholme, P. "Filtering of Network Addresses in Real Time by Sequential Decoding," IEE Proceedings, vol. 135, No. 1, Jan. 1988, pp. 55–59. (English).

*Primary Examiner*—Alyssa H. Bowler
*Assistant Examiner*—John Harrity
*Attorney, Agent, or Firm*—Fay, Sharpe, Beall, Fagan, Minnich & McKee

[57] ABSTRACT

A data transmission method is provided for a multi-computer system which has a plurality of computers mutually connected via a transmission line. The plurality of computers are divided into groups, with an address assigned to each group. Transmission data of a sending computer is provided with a location where the address is assigned and a location where a content code indicating the data content is assigned. The sending computer transmits the data with either the address or content code assigned, and the computers other than the sending computer decide whether or not to receive the data according to either the address or the content code.

9 Claims, 17 Drawing Sheets

U.S. PATENT DOCUMENTS

| | | | |
|---|---|---|---|
| 4,763,254 | 8/1988 | Mori et al. | 395/821 |
| 4,794,519 | 12/1988 | Koizumi et al. | 364/200 |
| 4,831,516 | 5/1989 | Tanaka et al. | 364/200 |
| 4,855,900 | 8/1989 | Simpson et al. | 364/200 |
| 4,926,375 | 5/1990 | Mercer et al. | 395/325 |
| 5,036,518 | 7/1991 | Tseung | 371/32 |
| 5,097,412 | 3/1992 | Orimo et al. | 395/500 |
| 5,193,149 | 3/1993 | Aniszio et al. | 395/200.2 |

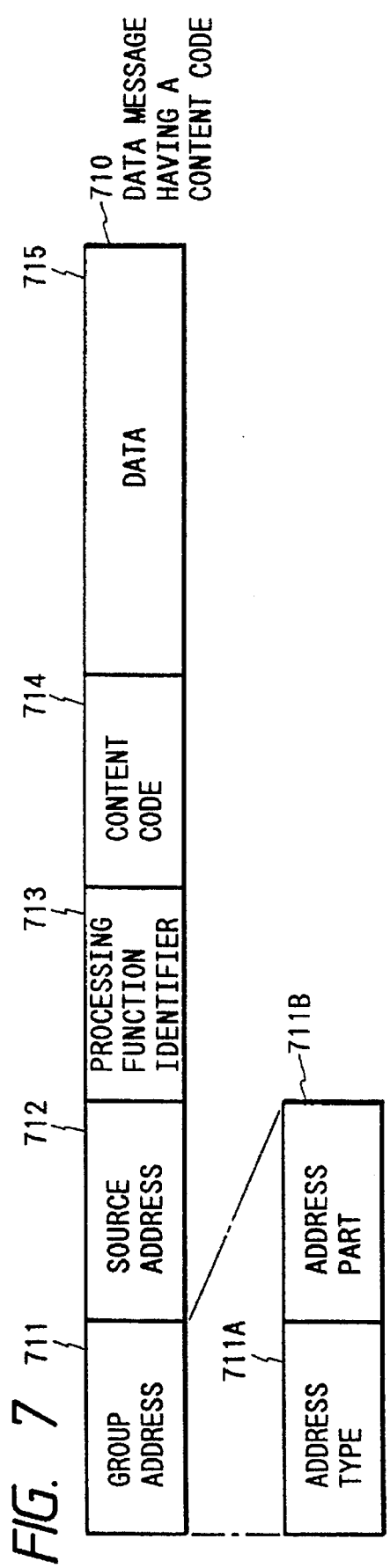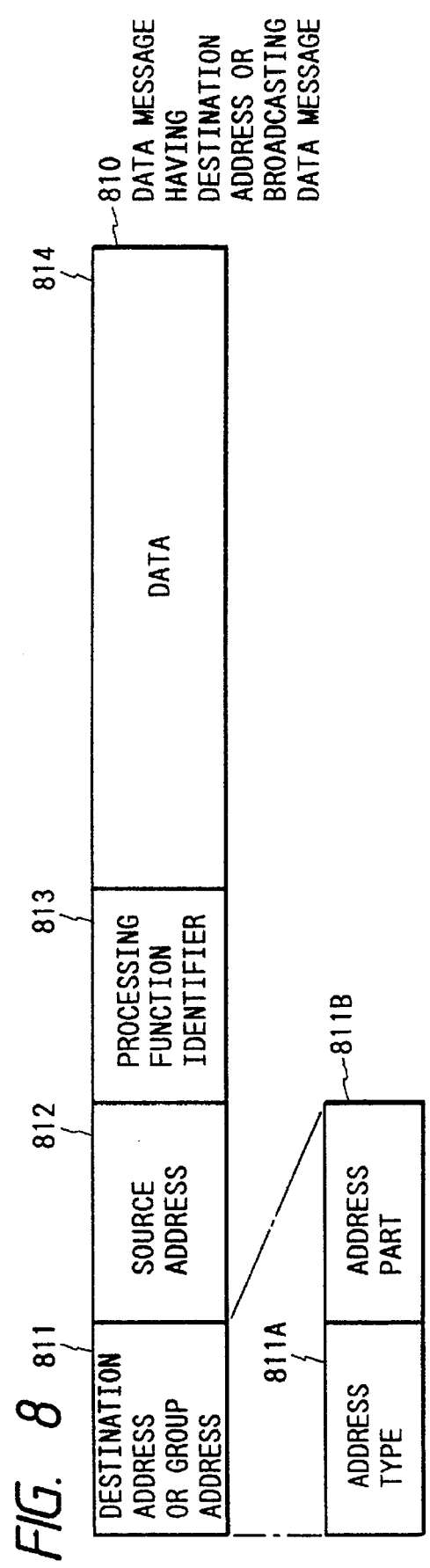

FIG. 11

| GROUP ADDRESS 137A | CONTENT CODE 137B | | | TRANSMISSION LINE ADDRESS 137C | | |
|---|---|---|---|---|---|---|
| 1 | CC1 | 20 | 30 | 40 | | |
| 2 | CC1 | 20 | 30 | 40 | | |
| .. | .. | .. | .. | .. | | |

137 TABLE FOR SELECTIVE TRANSMISSION

DATA PROCESSING SYSTEM AND DATA TRANSMISSION AND PROCESSING METHOD

This is a continuation of U.S. application Ser. No. 08/020,250 filed Feb. 18, 1993 now abandoned which is a continuation of U.S. application Ser. No. 07/558,080 filed Jul. 25, 1990, now abandoned.

BACKGROUND OF THE INVENTION

1. Field of the Invention

This invention relates to a data transmission method and a data processing method of a data processing system comprising a plurality of processing devices.

2. Description of the Prior Art

When a network system, which is connected to a multi-computer system or to a plurality of multi-computer systems with communication lines via gateways, communicates data, one-to-one communication with a destination address assigned to the data or broadcasting with a group address assigned to the data is conventionally performed.

Content code communication indicating that data is assigned a content code indicating the content of the data so that the receiver can decide whether or not to receive the data according to the content code is also available.

These two transmission methods are not used concurrently. A system will use only one transmission method.

In a large scale and wide area system, content code communication using communication lines is expensive except for destination fixed connection.

The communication method using a group address, for example, is indicated in INTAP-S002-02 (V0,R1). Content codes are, for example, indicated in Japanese Patent Publication 59-047905.

In the above prior art, communication using a content code indicating the data content and communication using a destination address or a group address for broadcasting cannot be used concurrently on one transmission line or on one system because they are different from each other in the data message format.

In a large scale and wide area multi-computer system, content code communication broadcasts a data message to all the computers and the receiver decides whether or not to receive the data, causing problems such as a large quantity of data and an increase in cost.

In a multi-computer system, as shown in FIG. 19, a plurality of computers 1901, 1902, 1903, - - - are connected to each other via a transmission line 1910, and transmit or receive data mutually. The computers 1901, 1902, 1903, - - - have external memories 1911, 1912, 1913, - - - for storing data. In the external memories 1911, 1912, 1913, - - -, files A, B, C, D, - - -, where, for example, indexed data is stored, are defined, and multiplexed files exist (for example, file A or file C).

One of the conventional methods which is used for recovering, for example, the file A of the computer 1902 of this multi-computer system, is a method providing that access to the file A is inhibited so that, the file A of the computer 1901 is copied onto the computer 1902, and then access to the file A is permitted after the copy is finished. Since this method inhibits access to the file A, current data of the file A is not generated during recovery, and the processing is simplified.

However, it is inconvenient that the file A cannot be accessed. A file recovery method, which is modified so that the file A of the computer 1901 can be accessed during recovery, is indicated, for example, in Japanese Patent Laid-Open 62-102342.

This recovery method is applied to a sequential file. As shown in FIG. 20(a), the file A of the computer 1901 is copied onto the computer 1902, and current data $A^+$ generated after the copy starts is added to the computer 1901 as usual but stored in a current data buffer b of the computer 1902. When the file A is copied including up to the data content when the copy starts, the current data $A^+$ stored in the buffer b is added as shown in FIG. 20(b). By doing this, the file A is recovered including the current data $A^+$.

In the above recovery method, the recovery processing unit needs a current data buffer for temporarily storing current data during recovery. Since the quantity of current data generated during this recovery period, however, cannot be estimated, an appropriate buffer size cannot be selected. For safety's sake, therefore, it is necessary to install a current data buffer with a capacity larger than the actually required one, causing a problem such as an inefficient facility load. Even if a current data buffer with a large capacity is installed, there is no guarantee that the quantity of current data will not exceed the capacity. If the quantity of current data does, there is a problem imposed that the storage content cannot be recovered. The same may be said with storage content expansion.

SUMMARY OF THE INVENTION

The first object of the present invention is to provide a data transmission method which allows communication by content codes to be easily incorporated in a system using communication only by destination addresses and group addresses and when content code data is transmitted by a large scale and wide area multi-computer system, the quantity of data which is transmitted on the communication lines is reduced and communication charges are extremely cut down.

The second object of the present invention is to provide a storage content recovery and expansion method which allows the storage content to be accessed during recovery and expansion, requires no buffer with a large capacity, and allows the storage content to be recovered and expanded when the quantity of current data increases.

The first object of the present invention is accomplished by a multi-computer system which comprises a plurality of computers mutually connected by a transmission line, characterized in that the computers are grouped and addressed, transmission data is provided with a location where the group address is the data content is assigned. The data with at least one of the group address and the content code assigned is transmitted to a computer, and the other computers decide whether or not to receive the data according to one of the group address and the content code.

The second object of the present invention is accomplished by a system which comprises a plurality of data processing devices which are connected to each other via a transmission line so that they can mutually transmit or receive data and store multiplexed data, characterized in that the storage content recovery and expansion supporting unit splits and transmits the storage content to be recovered and expanded to the transmission line as recovery and expansion data. The storage content recovery and expansion processing unit receives the foregoing recovery and expansion data from the transmission line and stores the received recovery and expansion data when the corresponding current data is not being stored. The multiplexed storage content can thus be recovered and expanded online.

BRIEF DESCRIPTION OF THE DRAWINGS

FIGS. 1 and 7 are format diagrams of data messages having content codes of the first embodiment of the present invention, FIG. 11 is an illustration showing the configuration of a table for selective transmission of the second embodiment of the present invention.

DETAILED DESCRIPTION OF THE PREFERRED EMBODIMENTS

Next, embodiments of the present invention will described hereunder with reference to the accompanying drawings.

Firstly, the first embodiment will be described.

Figure 1:
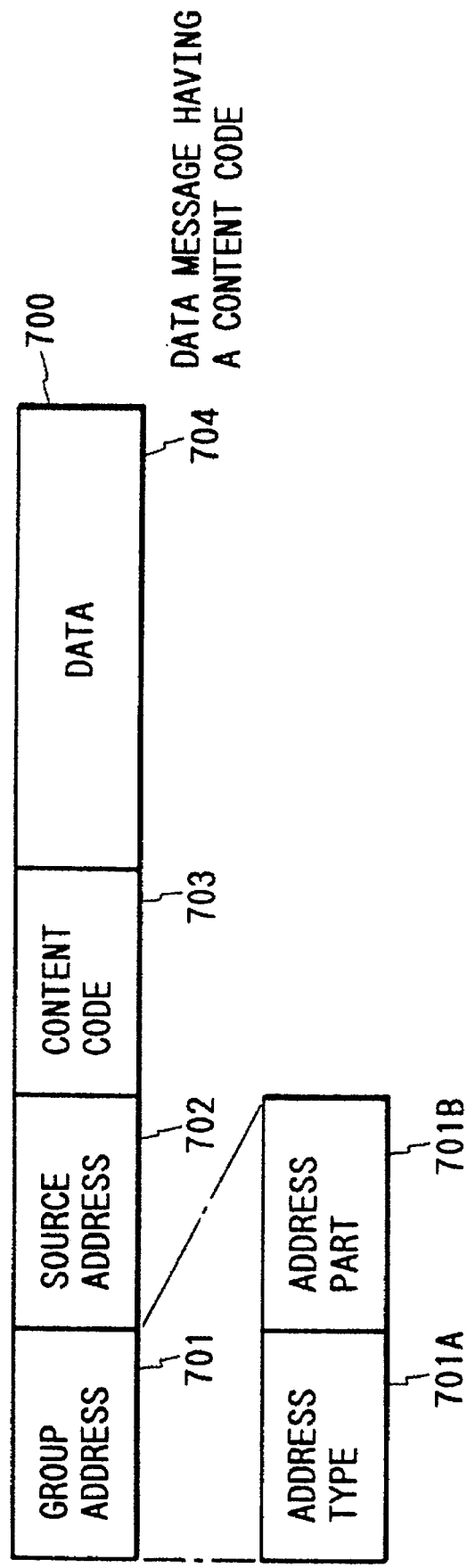
Figure 2:
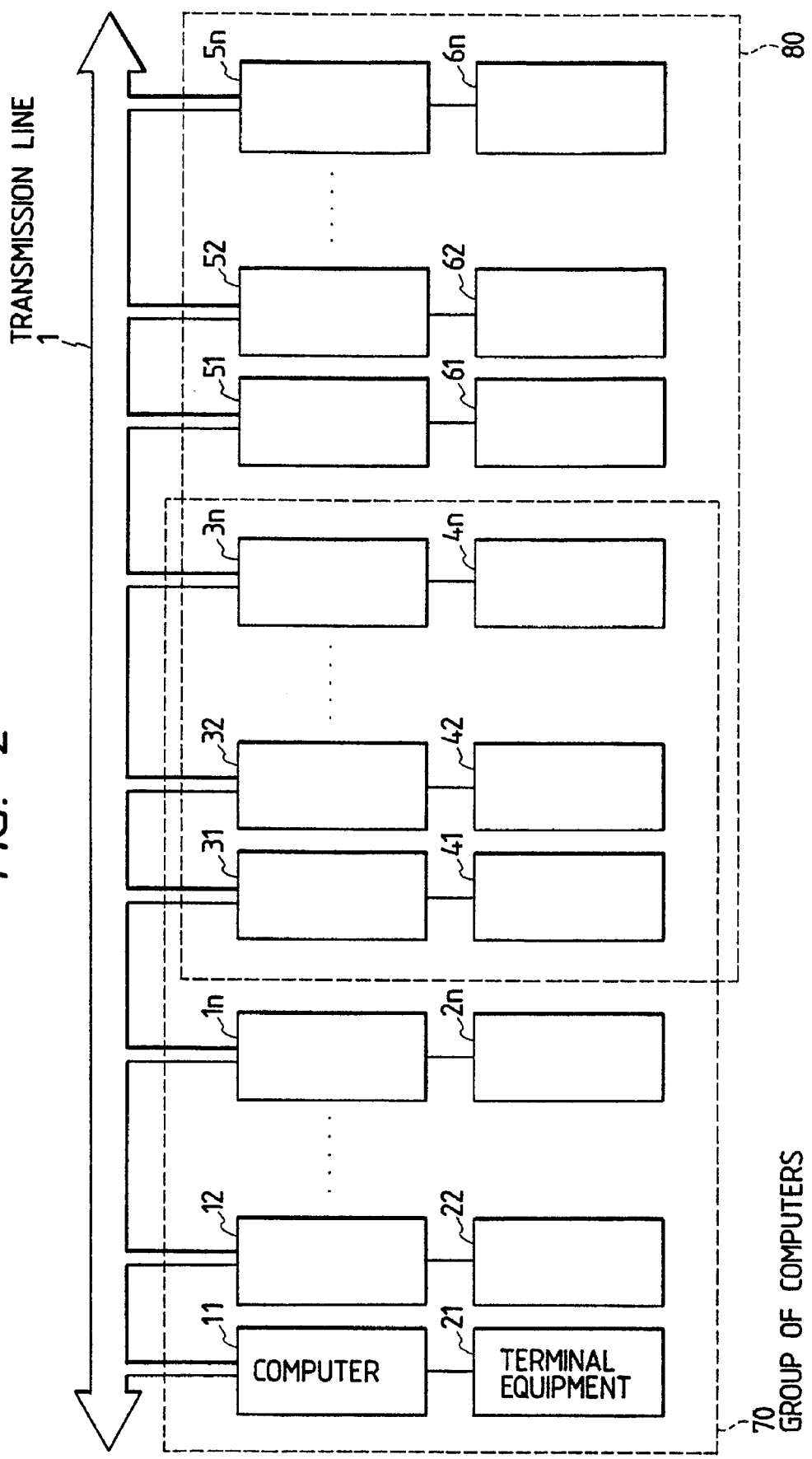
FIG. 2 is a schematic view of a multi-computer system of the first embodiment of the present invention.
Figure 3:
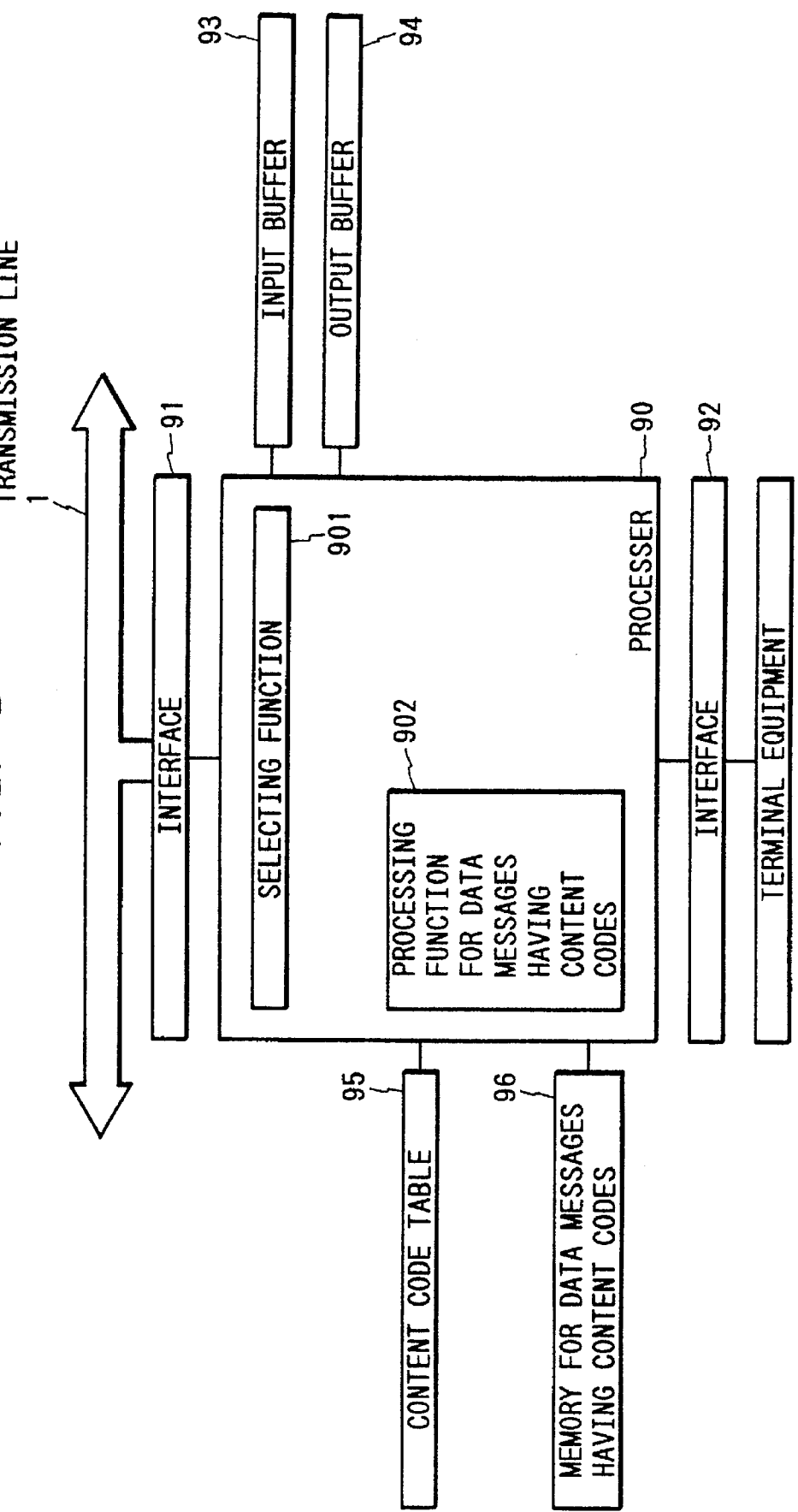
FIGS. 3, 4, and 6 are concrete schematic views of computers shown in FIG. 2, FIGS. 5A, 5B, and 8 are format diagrams of data messages having destination addresses and broadcasting data messages of the first embodiment of the present invention.
Figure 4:
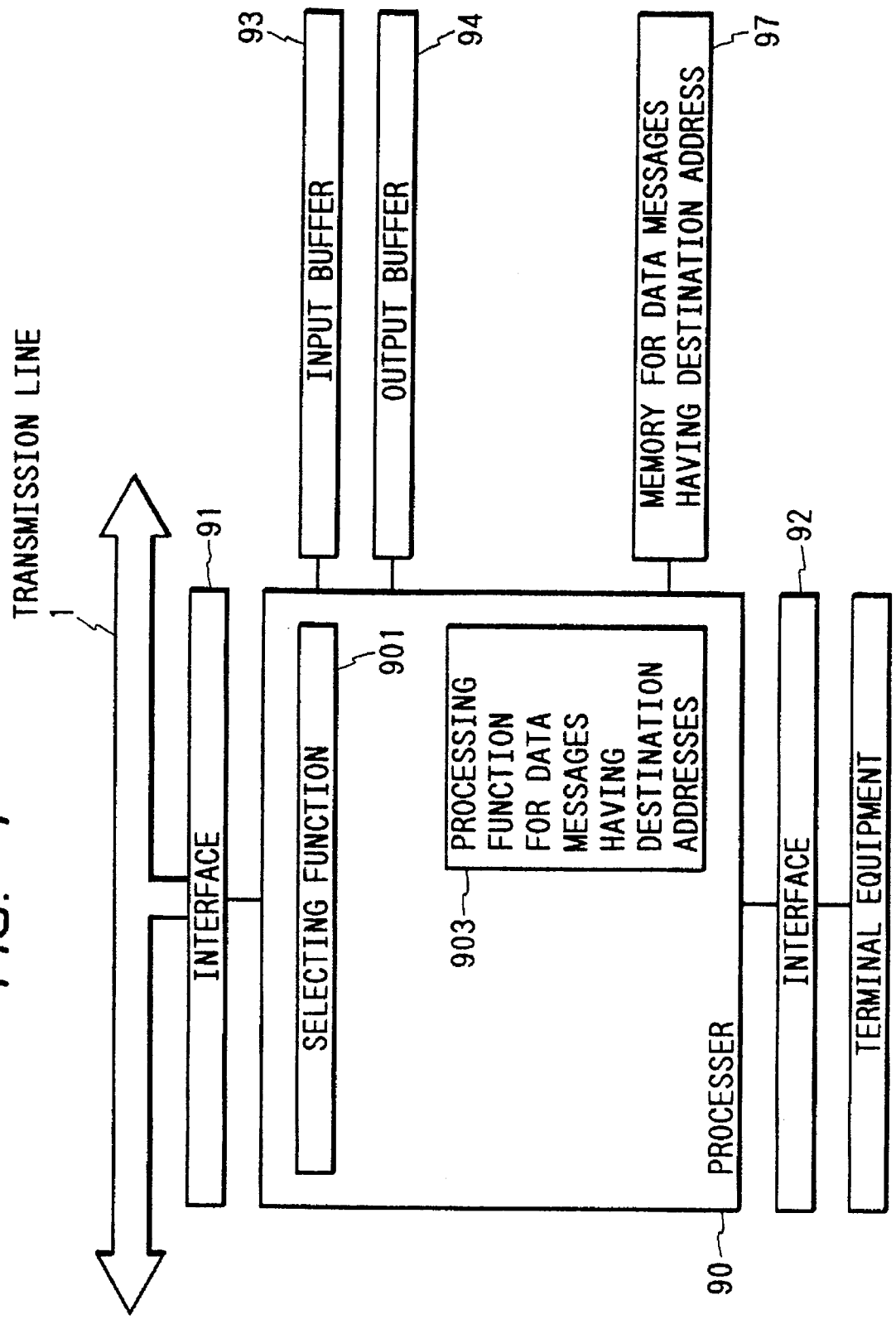
Figure 5A:
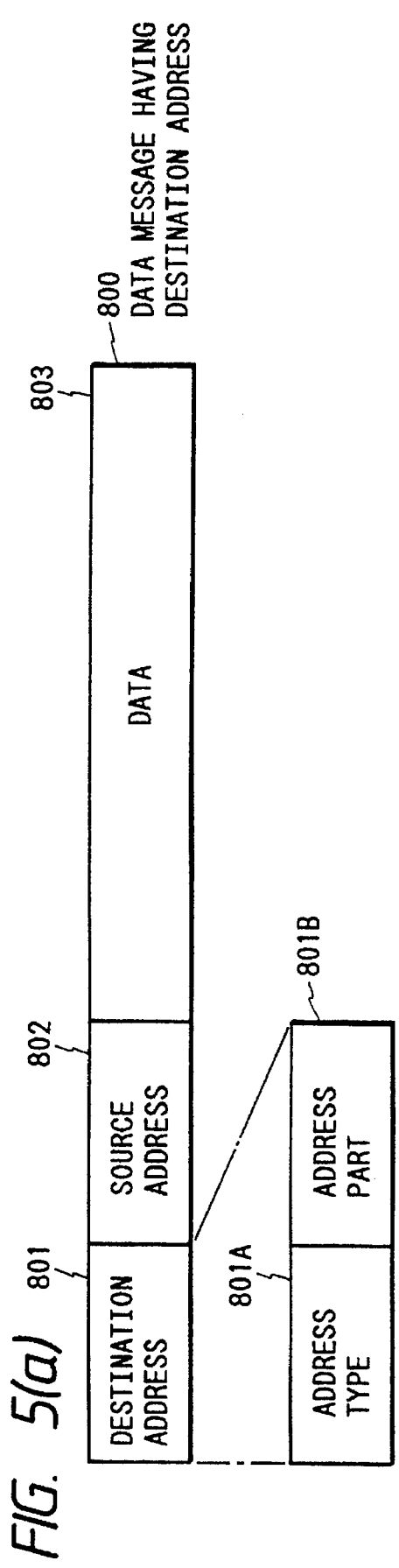
Figure 5B:
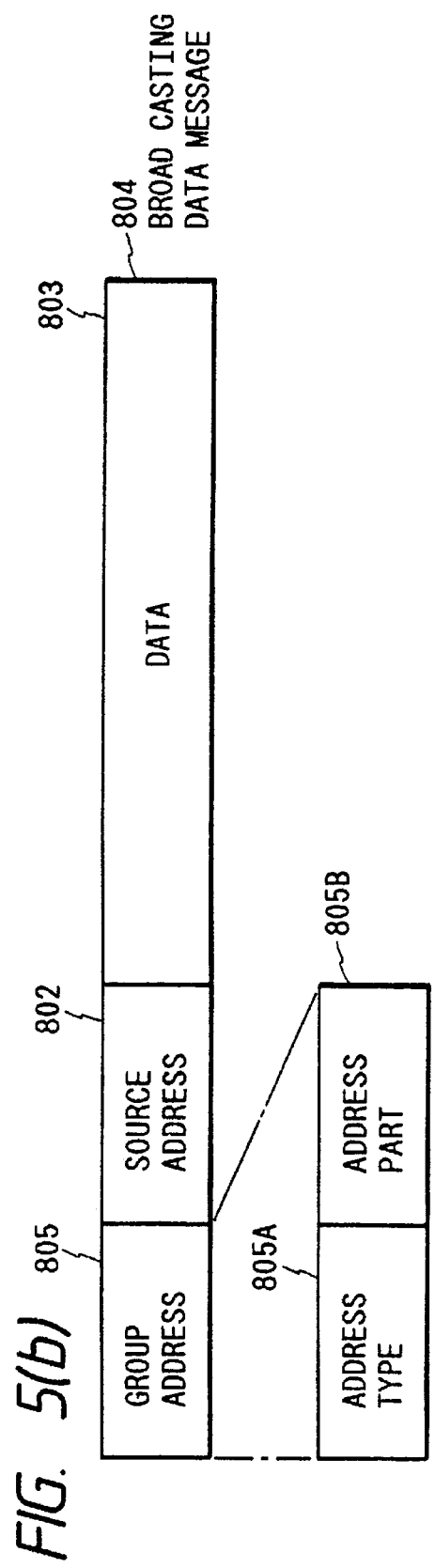
Figure 6:
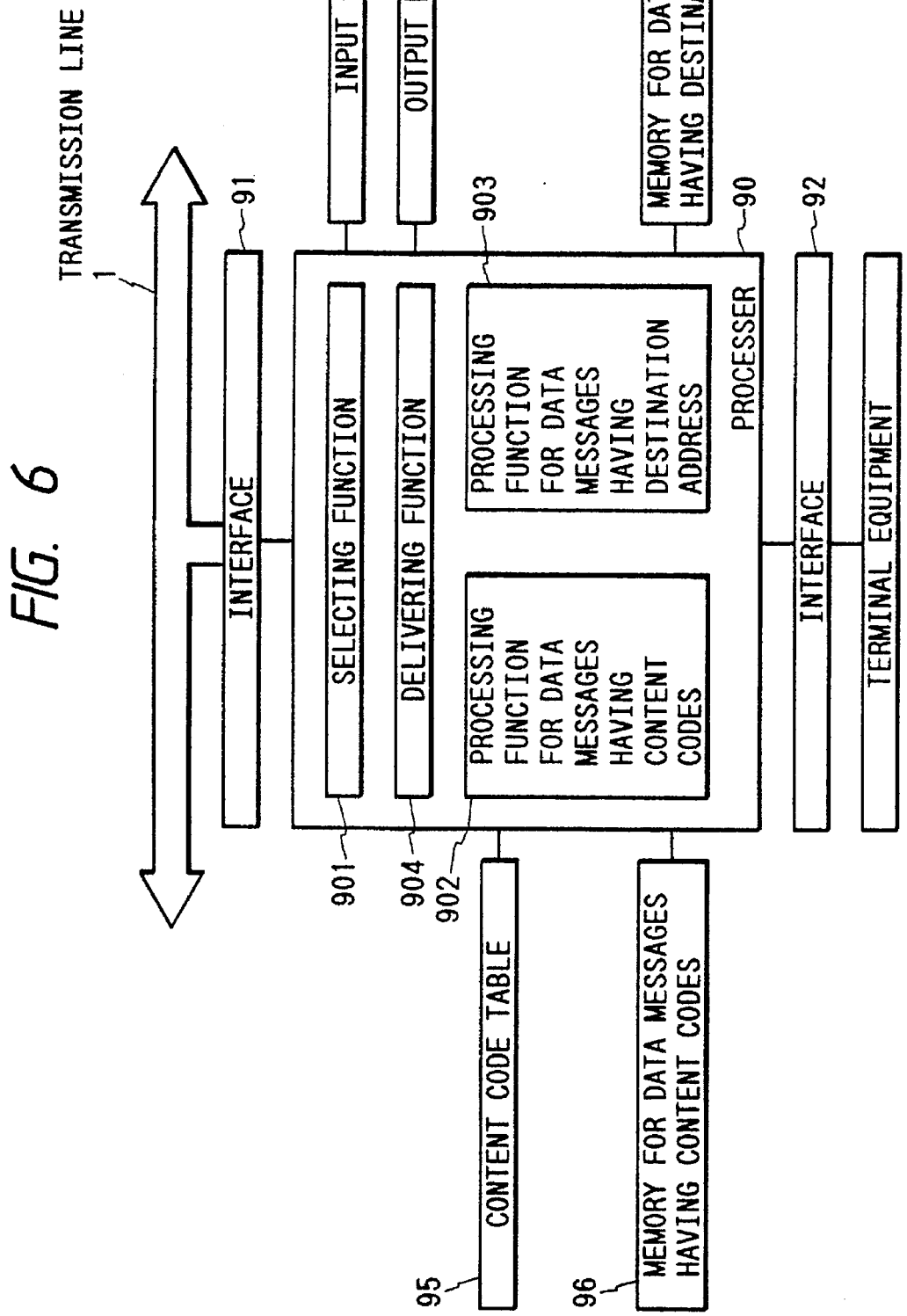

FIGS. 1 and 7 are format diagrams of data messages having content codes of the first embodiment of the present invention, FIG. 2 is a schematic view of a multi-computer system of the first embodiment of the present invention, FIGS. 3, 4, and 6 are schematic views of computers shown in FIG. 2, and FIGS. 5 and 8 are format diagrams of data messages having destination addresses and broadcasting data messages of the first embodiment of the present invention.

In this embodiment, computers 11 to 1n, 31 to 3n, and 51 to 5n are connected, as shown in FIG. 2, to each other via a transmission line 1 so as to transmit or receive data. The computers are connected to terminal equipment 21 to 2n, 41 to 4n and 61 to 6n respectively. A plurality of computers are divided into groups as shown by dot lines to form computer groups 70 and 80, and each group is assigned a group address.

Each of the computers 11 to 1n is configured as shown in FIG. 3.

A processor 90 shown in FIG. 3 is connected to the transmission line 1 via an interface 91 and to the terminal equipment via an interface 92. The processor 90 is also connected to an input buffer 93, an output buffer 94, a content code table 95, and a memory for data messages having content codes 96. The processor 90 provides a selecting function 901 and a processing function for data messages having content codes 902.

The selecting function 901 registers the group address of the computer group 70 which the computer itself belongs to.

Codes for indicating contents of data which can be processed by the computer via the processing function for data messages having content codes 902 are registered in the content code table 95 beforehand.

When transmitting data to the transmission line 1 via the processing function for data messages having content codes 902, the output buffer 94, and the interface 91, the computers 11 to 1n edit it as a data message 700 having the format shown in FIG. 1.

The data message 700 having a content code of this embodiment comprises data 704 itself, a content code 703 indicating the content of the data 704, a source group address 701, and a source computer address 702, and is called a data message having a content code. The group address 701 comprises an address type 701A and an address part 701B. This address type is used to determine whether the address is a group address or a destination address.

Each of the computers 51 to 5n is configured as shown in FIG. 4.

A processor 90 shown in FIG. 4 is connected to the transmission line 1 via an interface 91 and to the terminal equipment via an interface 92. The processor 90 is also connected to an input buffer 93, an output buffer 94, and a memory for data messages having destination addresses 97. The processor 90 provides a selecting function 901 and a processing function for data messages having destination addresses 903.

The selecting function 901 registers the address of the computer itself and the group address of the computer group 80 to which the computer itself belongs.

When transmitting data to the transmission line 1 via the processing function for data messages having destination addresses 903, the output buffer 94, and the interface 91, the computers 51 to 5n edit it as a data message having a destination address 800 which has the format shown in FIG. 5(a) or a broadcasting data message 804 shown in FIG. 5(b).

The data message having a destination address 800 of this embodiment comprises data 803 itself, a destination computer address 801, and a source computer address 802. The destination address 801 has the same format as that of the group address 701; that is, it comprises an address type 801A and an address part 801B. This address type is used to determine whether the address is a group address or a destination address.

The broadcasting data message 804 is the data message having a destination address 800 in which the destination address 801 is replaced with a source group address 805, and used to notify the group of the data. This broadcasting data message is received by all the computers of the computer group 80. The broadcasting data message 804 has the same format as that of the data message having a destination address 800. Therefore, both data messages are processed by the processing function for data messages having destination addresses 903.

Each of the computers 31 to 3n, is configured as shown in FIG. 6.

The computer comprises a combination of the components of the computers shown in FIGS. 3 and 4, and the processor 90 provides a delivering function 904.

The delivering function 904 distributes a data message to the two processing functions (the processing function for data messages having content codes 902 and the processing function for data messages having destination addresses 903). Therefore, the addresses are registered for each processing function; that is, the group address of the computer group 70 is registered for the processing function for data messages having content codes 902, and the group address of the computer group 80 and the address of the computer itself are registered for the processing function for data messages having destination addresses 903.

The selecting function 901 registers the address of the computer itself and the group address of the computer group 70 or 80 which the computer itself belongs to. All the content codes of data which can be processed via the processing function for data messages having content codes 902 are registered in the content code table 95.

Three types of data messages 700, 800, and 804 are transmitted to the transmission line 1 by the computers 31 to 3n, depending on the processing function.

Next, the processing procedures of the computers 11 to 1n, 31 to 3n, and 51 to 5n when a data message is transmitted to the transmission line 1 will be described hereunder.

Each of the computers 11 to 1n reads the data message into the input buffer 93 via the interface 91. Then, the selecting function 901 checks the head part of the read data message, such as the group address 701 or 805, or the destination address 801. If the address does not match the registered one, it is deleted. If the address does, it is transferred to the processing function for data messages having content codes 902.

The processing function for data messages having content codes 902 checks the content code 702 of the data message with the content code table 95. If the address does not match the registered one, it is deleted. If the address does, it is transferred to and received by the memory for data messages having content codes 96. On the basis of the content code 703 of the received data message 700 having a content code, the program for processing data having the content code is started to process the data. The program assigns the output data a predetermined output content code indicating the content of the data at the end of the processing, and transfers it to the processing function for data messages having content codes 902.

The processing function for data messages having content codes 902 edits it as a data message 700 having a content code and transfers it to the output buffer 94.

Each of the computers 51 to 5n reads the data message into the input buffer 93, and the selecting function 901 checks the head part of the data message. If the address does not match the registered one, it is deleted. If the address does, it is transferred to the processing function for data messages having destination addresses 903.

The processing function for data messages having destination addresses 903 transfers this data message having a destination address 800 to the memory for data messages having destination addresses 97 and finishes the reception. If necessary, the processing function 903 returns a reception response to the source. The subsequent processing by the program depends on whether or not to derive data or the destination of the output data.

Each of the computers 31 to 3n, reads the data message into the input buffer 93, and the selecting function 901 checks the head part of the data message. If the address does not match the registered one, it is deleted. If the address does, it is transferred to the delivering function 904.

The delivering function 904 distributes and transfers the data message to the processing function for data messages having content codes 902 and the processing function for data messages having destination addresses 903 according to the registered address and the group address. The subsequent processing is the same as the foregoing processing.

By using the data message 700 having a content code in which the group address 701 is assigned to the content code 703, incorrect processing caused by the data message 700 having a content code which is transferred to the processing function for data messages having destination addresses 903 or by the data message having a destination address 800 or the broadcasting data message 804 which is inversely transferred to the processing function for data messages having content codes 902 can be prevented. Therefore, communication using the data message 700 having a content code can be easily incorporated into a system which uses only the data message having a destination address 800 and the broadcasting data message 804 for communication.

For grouping, the computer groups 70 and 80 may be divided into smaller computer groups, and new group addresses may be assigned to the new computer groups.

Any two computers can be selected from a computer having only the processing function for data messages having content codes 902 such as the computers 11 to 1n, a computer having only the processing function for data messages having destination addresses 903 such as the computers 51 to 5n, and a computer having two types of processing functions 902 and 903 such as the computers 31 to 3n, so as to configure a system producing the same effect.

In a system which comprises a plurality of computers having only the processing function for data messages having content codes 902, when the computers are divided into a plurality of computer groups, a plurality of closed communication systems having content codes can be realized on one transmission line.

A data message having a content code can be configured as shown in FIG. 7, and a data message having a destination address or a broadcasting data message can be configured as shown in FIG. 8. In this case, the components other than the processing function identifiers 713 and 813 are the same as those in FIGS. 1 and 5. The processing function identifier indicates whether the data message is to be processed by the processing function for data messages having content codes 902 or by the processing function for data messages having destination addresses 903. Since a data message 710 or 810 is received and processed by the same type of processing function as the processing function which edits and creates the data message, the type of the processing function which edits and creates the data message is set in the processing function identifier at the time of editing and creation, by predetermining, for example, "0" as the processing function for data messages having content codes 902 and "1" as the processing function for data messages having destination addresses 903. By doing this, there is no need to register the destination address and the group address in the delivering function 904, and the delivering function 904 distributes the data message by the processing function identifier 713 or 813 for data messages.

A system in which there are a plurality of transmission lines, a plurality of computers are connected to each transmission line, and the transmission lines are connected to each other via gateways and broadcastable in the same way as one transmission line or a system in which computer groups are formed so that they span a plurality of transmission lines may produce the same effect as that of this embodiment.

Next, the second embodiment of the present invention will be described hereunder.

Figure 9:
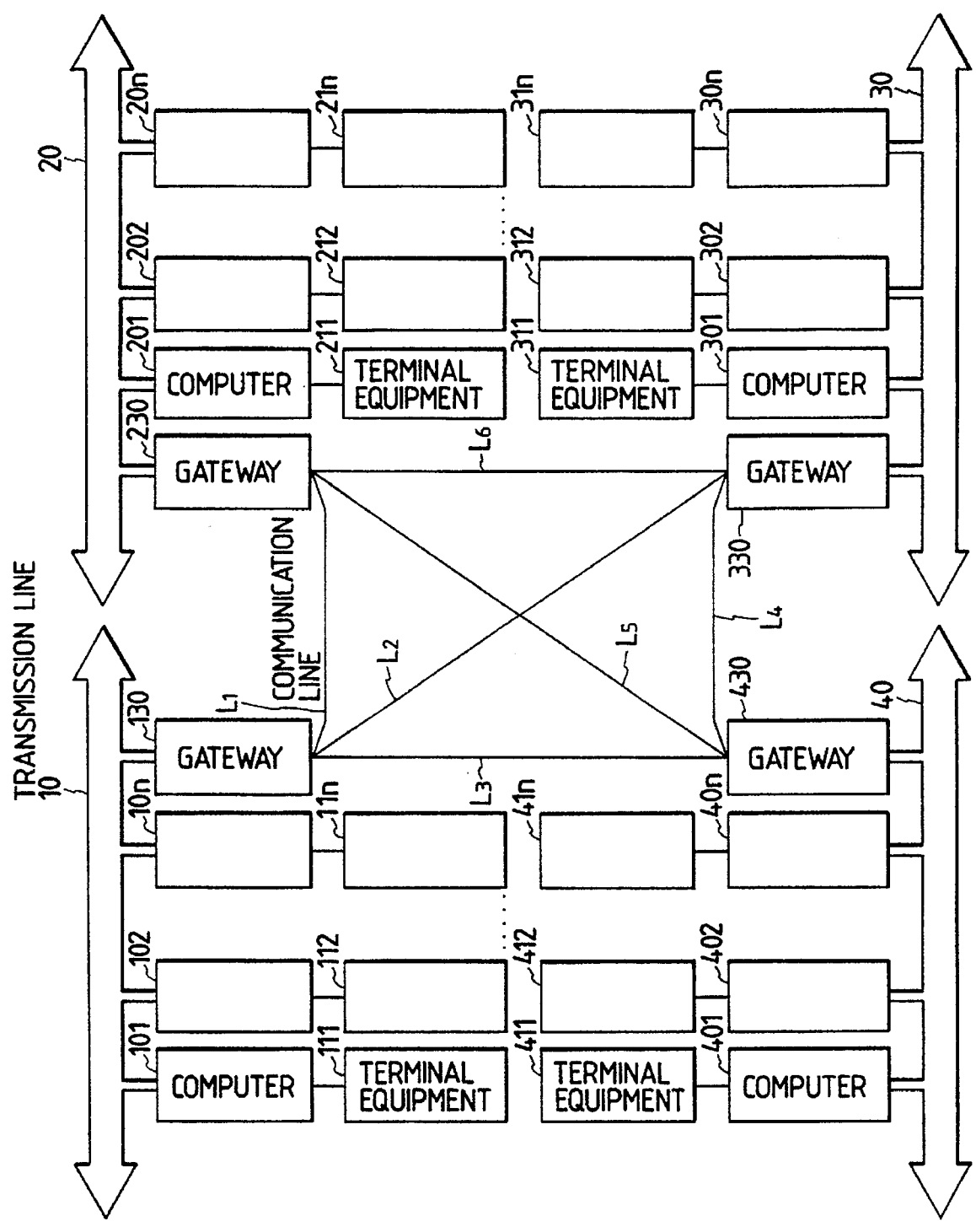
FIG. 9 is a schematic view of a network system of the second embodiment of the present invention.
Figure 10:
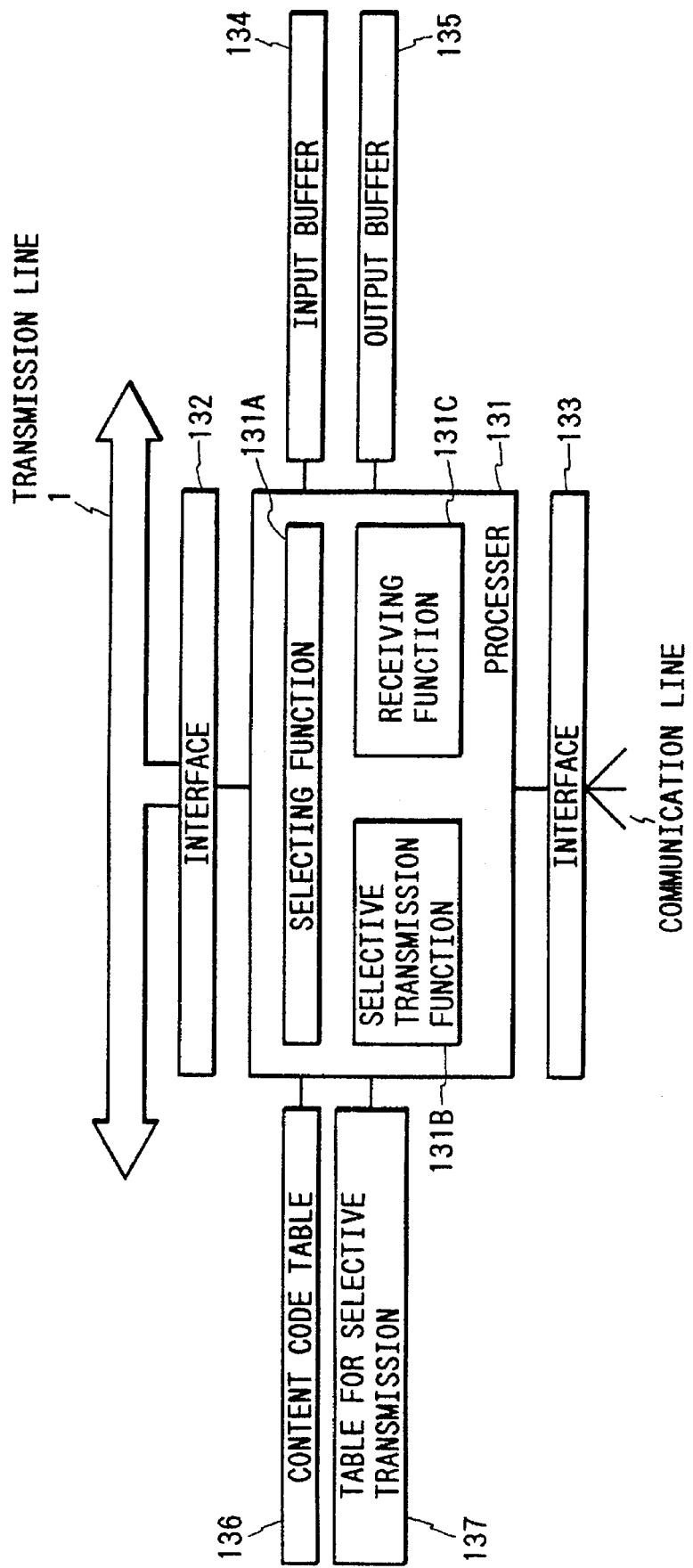
FIG. 10 is a schematic view of a gateway of the second embodiment of the present invention.
Figure 12:
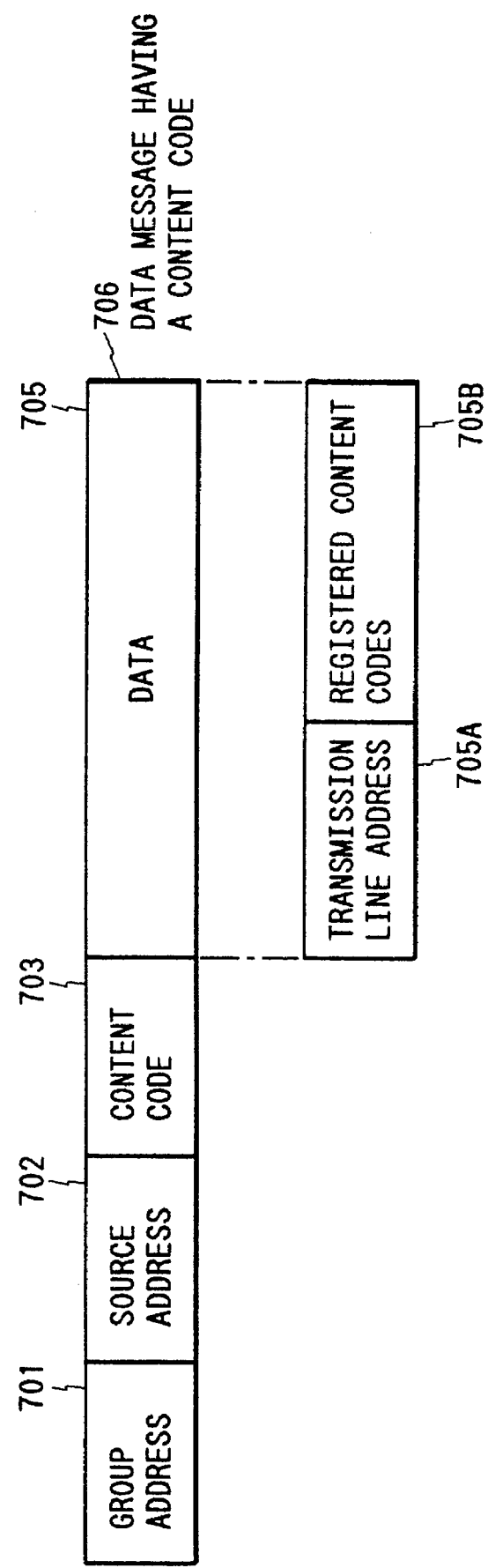
FIG. 12 is a format diagram of a data message having a content code of the second embodiment of the preset invention.

FIG. 9 is a schematic view of a network system of the second embodiment of the present invention, FIG. 10 is a schematic view of a gateway of the second embodiment of the present invention, FIG. 11 is an illustration showing the configuration of a table for selective transmission of the second embodiment of the present invention, and FIG. 12 is a format diagram of a data message having a content code of the second embodiment of the present invention.

In FIG. 9, computers 101 to 10n and a gateway 130 are connected to each other via a transmission line 10, and the computers are connected to terminal equipment 111 to 11n respectively. The gateway 130 belongs to every computer group existing on the transmission line 10, can be connected to a transmission line 20 via a communication line $L_1$ and a gateway 230, and also can be connected to transmission lines 30 and 40. The components on the transmission lines 20, 30, and 40 are the same as those on the transmission line 10, and computers 201 to 20n, 301 to 30n, and 401 to 40n, terminal equipment 211 to 21n, 311 to 31n, and 411 to 41n, and gateways 230, 330, and 430 are connected in the same way as those on the transmission line 10.

The communication lines $L_1$ to $L_6$ are, for example, special communication lines, public communication lines, or digital switched networks, and destination fixing connection such as a special communication line or package switching PVC or destination selection connection such as line or packet switching VC is available.

The computers of this embodiment, in the same way as the computer shown in FIG. 3, comprise a processor comprising an interface, a selecting function, and a processing function for data messages having content codes, an input buffer, an output buffer, a content code table, and a memory for data messages having content codes. In the same way as the first embodiment, each computer transmits a data message having a content code to the transmission line, decides whether or not to receive the data according to the group address and the content code, and receives it resultantly. The computers are grouped, at least one computer group exists, and a group address is assigned to each computer group.

In this embodiment, at least one group address common to the four transmission lines 10, 20, 30, and 40 exists. This allows computers of one computer group which exist on different transmission lines to transmit or receive data via communication lines. Each transmission line is assigned a transmission line address, which is possessed by a gateway thereof as information. Each transmission line address serves as a destination address for communication between gateways.

Next, the configuration of the gateways 130, 230, 330, and 430 will be described hereunder.

In FIG. 10, a processor 131 is connected to the transmission line via an interface 132 and to the communication lines via an interface 133. The processor 131 is also connected to an input buffer 134, an output buffer 135, a content code table 136, and a table for selective transmission 137.

The processor 131 provides a selecting function 131A, a selective transmission function 131B, and a receiving function 131C. The selecting function 131A registers the group addresses (in this case, all the group addresses existing on the transmission line 10) of all the computer groups which the computers belong to. The selective transmission function 131B registers the transmission line addresses. Content code CCI for indicating that the data content is the registered content code is registered in the content code table 136 beforehand.

Next, the configuration of the table for selective transmission 137 will be described hereunder.

FIG. 11 shows a configuration example of the table for selective transmission 137 of the gateway 130. The first row is for the group address 137, and the second row for the content code 137B. The third and subsequent rows indicate that there are a plurality of transmission line addresses 137C.

The first row, for example, means that a data message having a content code, which has a group address of 1 and a content code of CC1, is also required by the transmission lines 20, 30, and 40.

In the table for selective transmission 137, the content code CCI indicating that the data content is the registered content code, which is set at all the group addresses existing on the transmission line 10, and the transmission lines connectable by the communication lines $L_1$ to $L_3$, which are set at the transmission line addresses 137C, are registered.

Each computer registers, beforehand, a content code indicating the content of the data, which can be processed by itself, in a content code table, which is the same as that used in the first embodiment (FIG. 3), by an appropriate method, for example, by the operator via the terminal equipment. In this case, the processing function for data messages having content codes edits the registered content code as data in the format of a data message having a content code 706 shown in FIG. 12 and transmits it to the transmission line. The content code which is registered right now is entered in the registered content code 705B, and the code CCI indicating that the data is the registered content code is entered in the content code 703. Since each computer has no information on the transmission line address 705A, nothing is set at the transmission line address.

Next, the gateway processing procedure of this embodiment will be described hereunder.

When the data message having a content code 706, for example, is transmitted to the transmission line 10, the gateway 130 reads the data message into the input buffer 134 via the interface 132. The selecting function 131A checks the head part of the read data message or the group address 701.

If the group address does not match the registered one, it is deleted. Since all the group addresses on the transmission line 10 are registered by the selecting function 131A, the group address naturally matches the registered one.

When the group address matches the registered one, it is transferred to the selective transmission function 131B.

The selective transmission function 131B checks the content code of the data message having a content code with the content code table. If the content code does not match the registered one, it is deleted. Since the content code CCI is registered beforehand, the content code naturally matches the registered one. For the data message having a content code 706 in which the content code 703 is CCI, a registered transmission line address is set at the transmission line address 705A for data 705.

When the content code matches the content code table 136, the selective transmission function searches for the table for selective transmission 137 according to the group address 701 and the content code 703 of the data message, and determines some gateways according to the transmission line address 137 of the table as a destination address where the data is to be transmitted by a communication line. The selective transmission function 131B performs destination selection connection, if necessary, on the basis of this information, and transmits this data message having a content code as data. A data message having a content code which is CCI is transmitted to all the gateways.

A gateway which receives this message, for example, the gateway 230, transfers this data message having a content code to the receiving function 131C.

The receiving function 131C transfers the data message having a content code to the output buffer 135, and transmits it to the transmission line 20 via the interface 132. When the content code 703 of the data message having a content code is CCI, the receiving function 131C checks the group address 701. When the group address 701 matches one of the addresses which are registered by the selecting function 131A, the receiving function registers the registered content code of the data 704 in the content code table 136, and sets and registers the group address 701, the registered content code 704B, and the transmission line address 704A in the table for selective transmission 137. When a set of the group address and the registered content code exists in the table, the transmission line address 705A can be added without duplication.

One of data messages having content codes which is transmitted by the gateway 130, 230, 330, or 430 to the transmission line thereof and required by a computer connected to another transmission line can be known by the content code table 136, and the computer on the transmission line which requires the data message can be known by the table for selective transmission 137.

The processing of the gateway when a data message having a content code 706 in which the content code is other than CCI is transmitted to the transmission line is, as mentioned above, the same as that when the content code is CCI.

In a system comprising a plurality of multi-computer systems which perform content code communication on broadcastable transmission lines and are connected by communication lines in a one-to-one correspondence, especially in a large scale and wide area system, the table for selective transmission 137 reduces the data quantity transmitted on the communication lines and the gateway load. In the case of destination selection connection, the communication charge can also be extremely reduced.

When the entire system configuration information such as a transmission line address of another transmission line is provided to only the gateways, each computer can transmit or receive data without knowing not only the system configuration information on its own transmission line but also the entire system configuration information such as another computer address, another transmission line address, and another group address. This provides excellent system expandability.

The transmission line address of the own transmission line can be possessed by each computer as information. If this occurs, in the data message having a content code 706 which has the registered content code as data, the transmission line address 705A is set when the data message is to be transmitted by each computer. Therefore, there is no need to set it by the gateway selective transmission function.

The foregoing three types of computers may be simultaneously connected to the transmission line.

The number of multi-computer systems which are connected by communication lines can be set optionally.

Since the foregoing embodiment can process individually a data message having a content code, a data message having a destination address, and a broadcasting data message, communication using content codes can be incorporated into a system which performs communication using only destination addresses and group addresses, or communication using destination addresses and group addresses can be incorporated into a system which performs communication using only content codes.

Since each gateway transfers data only to a necessary multi-computer system, the data quantity is extremely reduced and the gateway load is lowered. For communication lines of destination selection connection, the communication charge can be extremely reduced.

Each computer can communicate data using content codes without knowing the system configuration information, providing an expandable system configuration.

Figure 13:
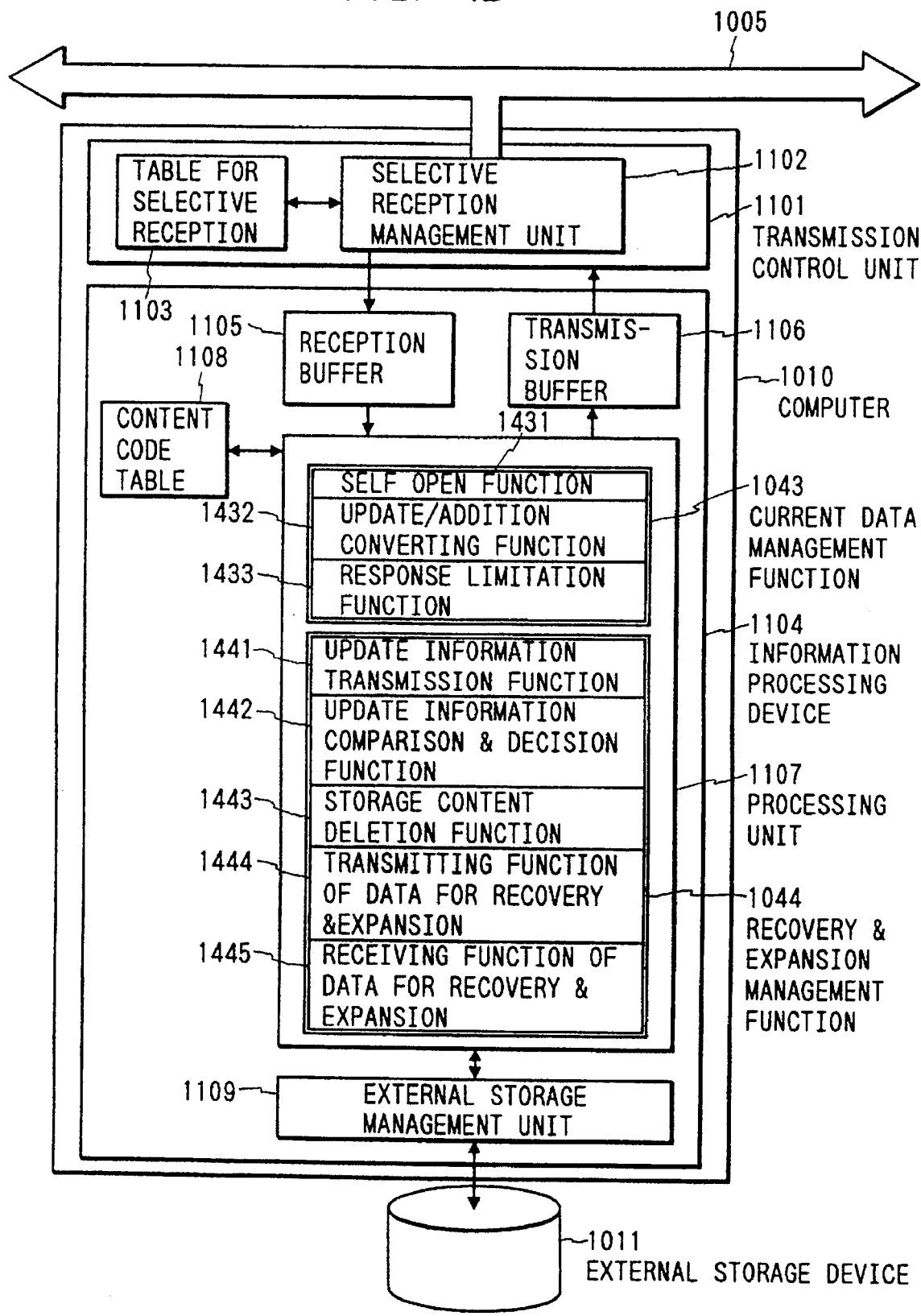
FIG. 13 is a block diagram of a computer of the third embodiment of the present invention.
Figure 19:
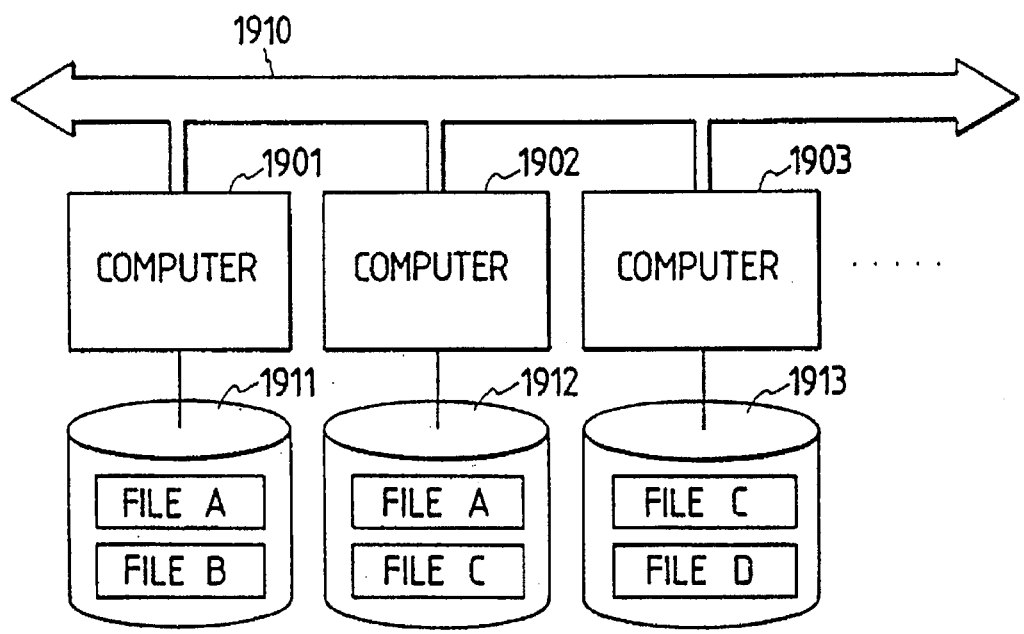
FIG. 19 is a block diagram of a multi-computer system having conventional multiplexed files, and FIGS. 20(a) and (b) are conceptual diagrams for explaining the conventional file recovery and expansion method.
Figure 20A:
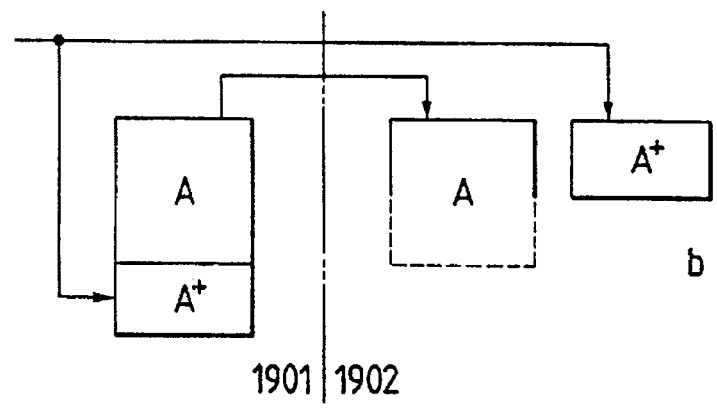
Figure 20B:
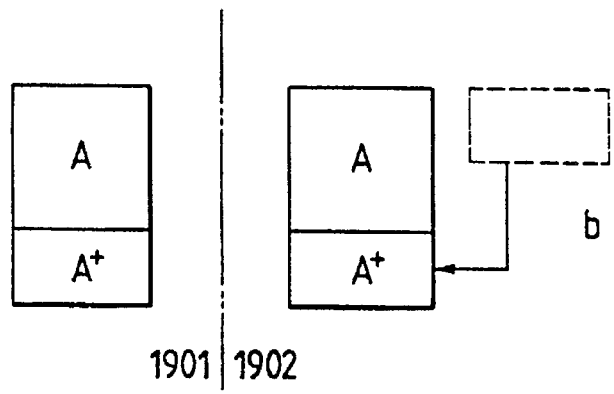

FIG. 13 is a block diagram of a computer 1010 of the third embodiment of the present invention, which is connected to other computers (not shown) via a transmission line 1005 in the same way as the configuration shown in FIG. 19. The computer has an external storage device 1011.

The computer 1010 comprises a transmission control unit 1101 and an information processing device 1104.

The transmission control unit 1101 comprises a selective reception management unit 1102 and a table for selective reception 1103. In the table for selective reception 1103, content codes indicating many types of data which can be processed by this computer 1010 are registered.

The information processing device 1104 comprises a reception buffer 1105, a transmission buffer 1106, a processing unit 1107, a content code table 1108, and an external storage management unit 1109.

The processing unit 1107 provides a current data management function 1043 and a recovery and expansion management function 1044.

The current data management function 1043 provides a self open function 1431, an update/addition converting function 1432, and a response limitation function 1434.

The recovery and expansion management function 1044 provides an update information transmission function 1441, an update information comparison and decision function 1442, a storage content deletion function 1443, a transmitting function of data for recovery and expansion 1444, and a receiving function of data for recovery and expansion 1445.

Figure 14:
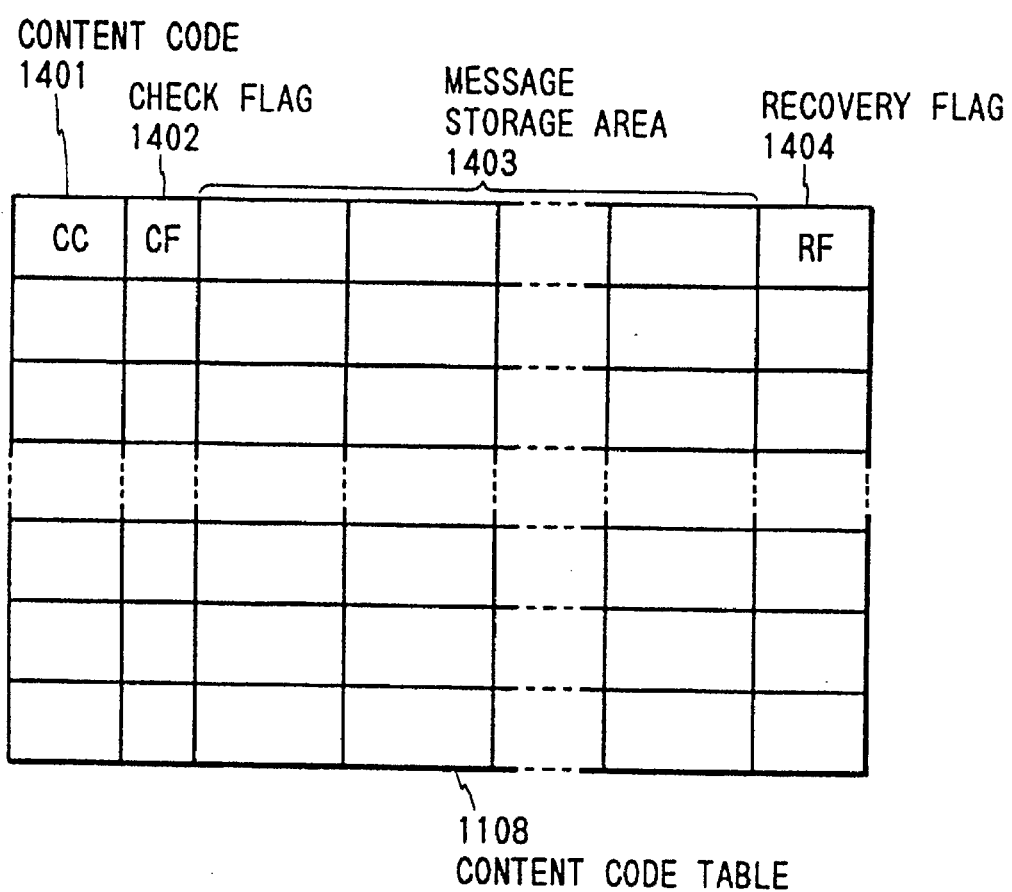
FIG. 14 is a conceptual diagram for explaining the configuration of a content code table of the third embodiment of the present invention.

The content code table 1108, as shown in FIG. 14, has buffer areas which are delimited by content codes of many types of data which can be processed by the computer 1010. Each buffer area comprises a content code 1401, a check flag 1402, a message storage area 1403, and a recovery flag 1404.

Figure 15:
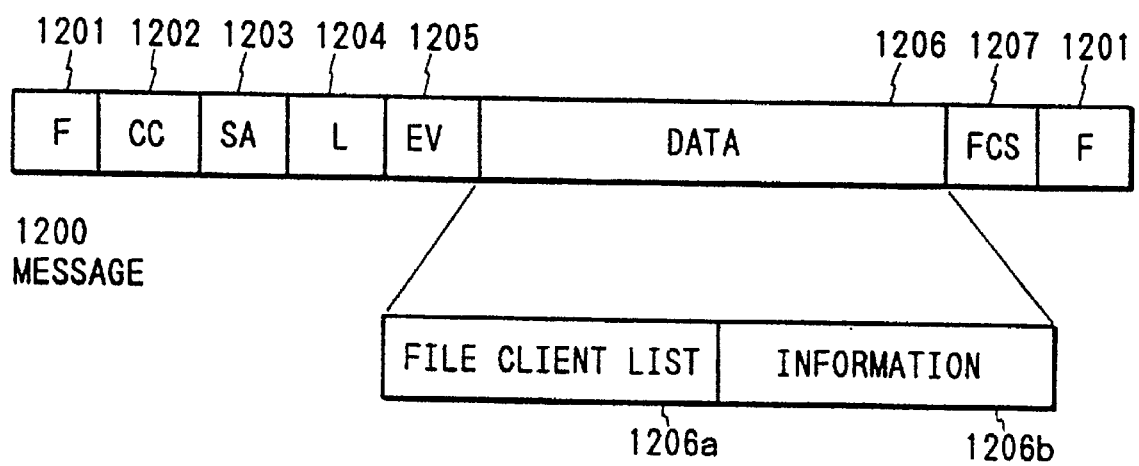
FIG. 15 is a format diagram of a message of the third embodiment of the present invention.

FIG. 15 shows a format of a message 1200 which flows through the transmission line 1005. Numeral 1201 indicates a flag representing the start or end of the message 1200, 1202 a content code representing the content type of data 1206, 1203 an address of the source computer 1010 of the message 1200, 1205 an event number, 1206 data itself, and 1207 a frame check sequence for checking a transmission error of the message 1200.

The event number 1205 comprises an event number for specifying an event of data drive which is used to drive a program and a serial number of generated data.

The data itself 1206 comprises a file client list 1206a and information 1206b when the data is for accessing or responding to the file. The file client list 1206a contains data necessary for accessing the file, for example, an access mode (read, update, addition), record length, block length, key length, key location, and self open flag.

Access to a file starts with an open instruction and ends with a close instruction. When access starts without an open instruction, an instruction issue sequence error is caused. Therefore, when a computer 1010 having a file which is already open in the system starts later, an instruction issue sequence error occurs in the computer 1010.

The system of the present invention prevents an occurrence of an instruction issue sequence error as described below.

When an open instruction for opening a file succeeds, each computer 1010 sets the self open flag in the file client list 1206a of the message 1200 containing the current data on the file to 1 until a close instruction is issued. When an instruction issue sequence error occurs, the self open function 1431 of each computer 1010 checks the self open flag in the file client list 1206a of the message 1200. When the self open flag is 1, the self open function opens a file and allows the access instruction to be executed once again.

By doing this, an instruction issue sequence error for a file which starts halfway when a series of file access instructions starting with the open instruction and ending with the end instruction are executed can be avoided.

In the case of processing comprising a pair of reading and writing such as update mode access, when the processing starts with data which requires writing at the time of start, an instruction issue sequence error may occur even if the above self open processing is performed. In this case, a flag indicating whether the reading, which is a counterpart to the writing causing the instruction issue sequence error, succeeds or not may be set in the message in the same way as the above self open processing so that the reading is performed according to the flag and then the writing is performed.

The processing in the normal state instead of recovery and expansion is performed as follows: When the message 1200 flows on the transmission line 1005, the selective reception management unit 1102 views the content code 1202 of the message 1200 and checks whether the content code is registered in the table for selective reception 1103. When the content code is not registered in the table for selective reception, the selective reception management unit ignores the message 1200. When the content code is registered, the selective reception management unit transfers the message 1200, from which the flags 1201 indicating the start and end thereof are removed, to the reception buffer 1105.

The message 1200 transferred to the reception buffer 1105 is buffered in the message storage area 1403 of the corresponding buffer area of the content code table 1108 according to the content code 1202. When the message is buffered in the message storage area 1403, the check flag 1402 is set to 1.

The processing unit 1107 fetches the message 1200 from the message storage area 1403 of the buffer area, in which the check flag 1402 is set to 1, on a first-in first-out basis, and transfers and processes the data to the user program according to the content code 1401 or accesses a file of the external storage device 1011 via the external storage management unit 1109.

A message transmitted from the user program or a response message to a file access request message is generated from the processing unit 1107, transferred to the transmission buffer 1106, and transmitted to the transmission line 1001 via the transmission control unit 1101.

The same event number 1205 is assigned to a file access request message and a response message thereof.

Since the files are multiplexed, a plurality of response messages may flow on the transmission line 1005 to one file access request message. If this occurs, the computer which requests file access selects and receives a message, for example, on a first-come first-served or majority basis.

Next, the processing for recovery and expansion will be described hereunder.

Assuming that an external storage device 1011 is in a temporarily unaccessible state due to, for example, a fault or power OFF of the external storage device, or due to a fault or power OFF of the corresponding computer 1010, the files in the external storage device 1011 are not updated because they cannot be accessed, and an unmatch may occur among the multiplexed files. Therefore, when the external storage device 1011 becomes physically accessible (when the external storage memory 1011 starts), an occurrence of an unmatch is checked.

When the external storage device 1011 enters the physically accessible state, the response limitation function 1433 of the processing unit 1107 sets the recovery flag 1404 of the buffer area having the content code 1401 which means access to a file of the content code table 1108 to 1, and inhibits a response to an access request to a file in the external storage device 1011.

After the recovery flag 1404 is set to 1, the update information transmission function 1441 of the processing unit 1107 transmits a file start message to the transmission line 1001. The content code 1202 of this file start message has a content code indicating a file start message, and the data 1206 has a file name, a content code meaning access to the file, and a file event number.

The file event number indicates file update information provided for each file. When accessing a file on the basis of a received message, the event number 1205 of the message is updated as a file event number. In the case of access in the read mode that the file contents are not changed by the access, the file event number is not updated. Instead of this update method, a method that the file event number is updated only when the file is opened or closed may be used.

When the file start message flows on the transmission line 1001, all the computers 1010 fetch it, and check whether the content code of the data 1206 exists in the content code 1401 of the content code table 1108 (whether the file exists or not). If the file is not found, nothing is done. When the file is found, each computer decides whether the file is under recovery according to the recovery flag 1404 of the buffer area of the content code 1401. When the file is under recovery, nothing is done. If the file is not under recovery, the update information comparison and decision function 1442 of the processing unit 1107 checks and compares the file event number of the file with the file event number of the data 1206 of the file start message. When the file event number of the file matches the file event number of the data 1206, the update information comparison and decision function 1442 transmits a message indicating that recovery is not necessary to the transmission line L. When the file event number of the file does not, the update information comparison and decision function 1442 transmits a recovery processing message indicating that recovery is necessary to the transmission line L. The recovery processing message has a content code 1202 indicating a recovery processing message and data 1206 comprising four types of information such as a file name, a content code meaning access to the file, a flag indicating recovery processing of the file, and file definitions such as a file processing method and attributes.

The computer 1010 which transmits the start message fetches this recovery processing message. When it is found that no recovery is necessary, the computer returns the recovery flag 1404 of the buffer area having the content code 1401 of the content code table 1108, which means access to the file, to 0. When it is found that recovery is necessary, the storage content deletion function 1115 of the processing unit 1107 deletes the file (so as to prevent data, which exists in the recovery processing unit but is already deleted in the recovery supporting unit, from remaining in the recovery processing unit after the recovery processing is finished). The storage content deletion function 1115 redefines the file on the basis of the file definition information contained in the data 1206 of the recovery processing message, and transmits a recovery preparation completion message to the transmission line L. The preparation completion message has a content code 1202 indicating a recovery preparation completion message and date 1206 containing two types of information such as a file name and a content code meaning access to the file.

A file can be expanded on the basis of the above procedure. During the online processing, a file which is the same as a one existing in the system is defined, the recovery flag 1404 of the file is set to 1, the file event number is left blank, and the file start message is transmitted to the transmission line 1005. Since the file event number is blank, a recovery processing message indicating recovery processing is surely sent back. After the message is received, the above processing is performed and a recovery preparation completion message is transmitted to the transmission line 1005.

When the recovery preparation completion message flows on the transmission line 1005, the computer (hereinafter called a recovery and expansion supporting computer) 1010 which transmits the recovery processing message fetches it.

Figure 16:
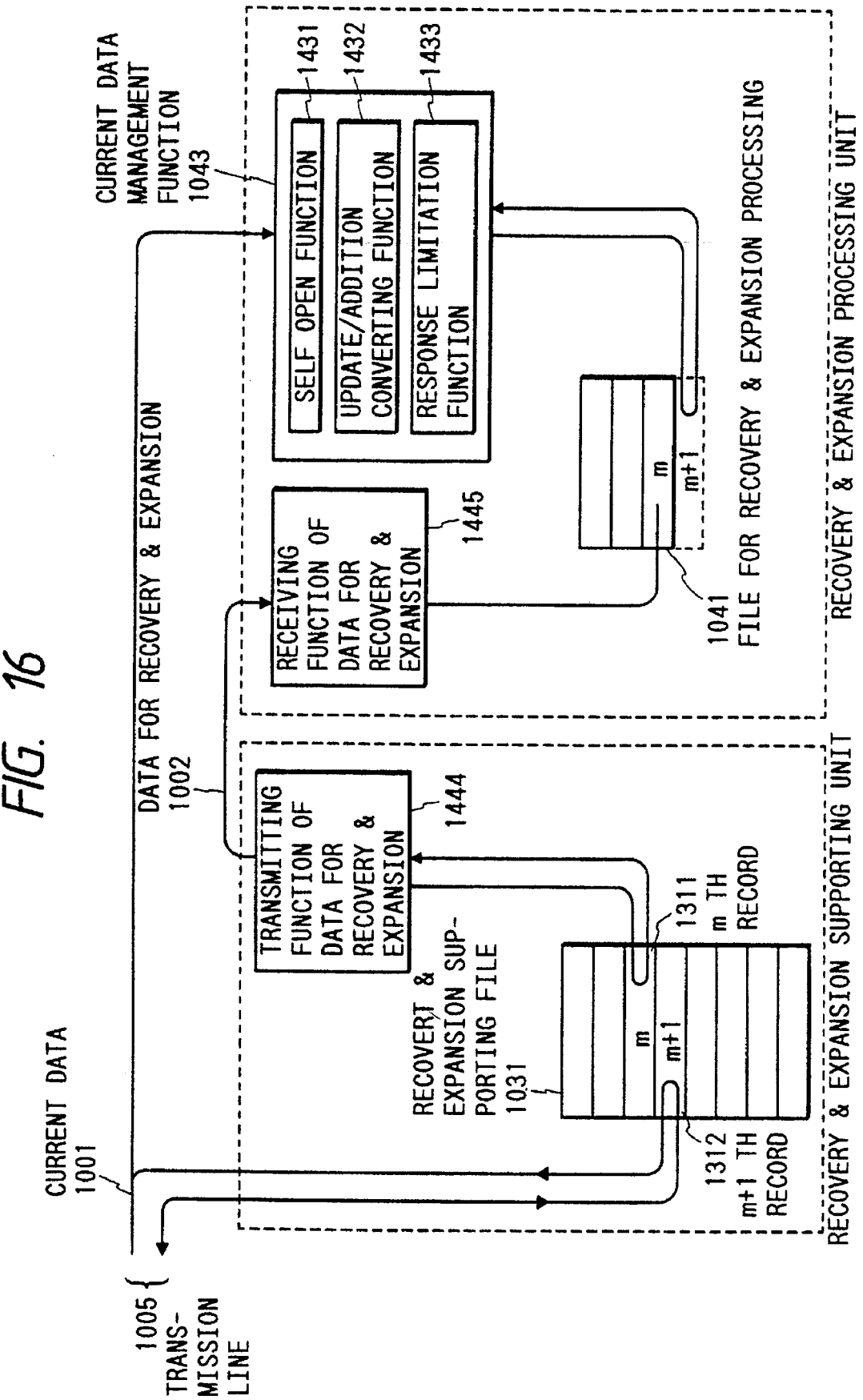
FIG. 16 is a block diagram showing the data flow of the third embodiment of the present invention during recovery and expansion.
Figure 17:
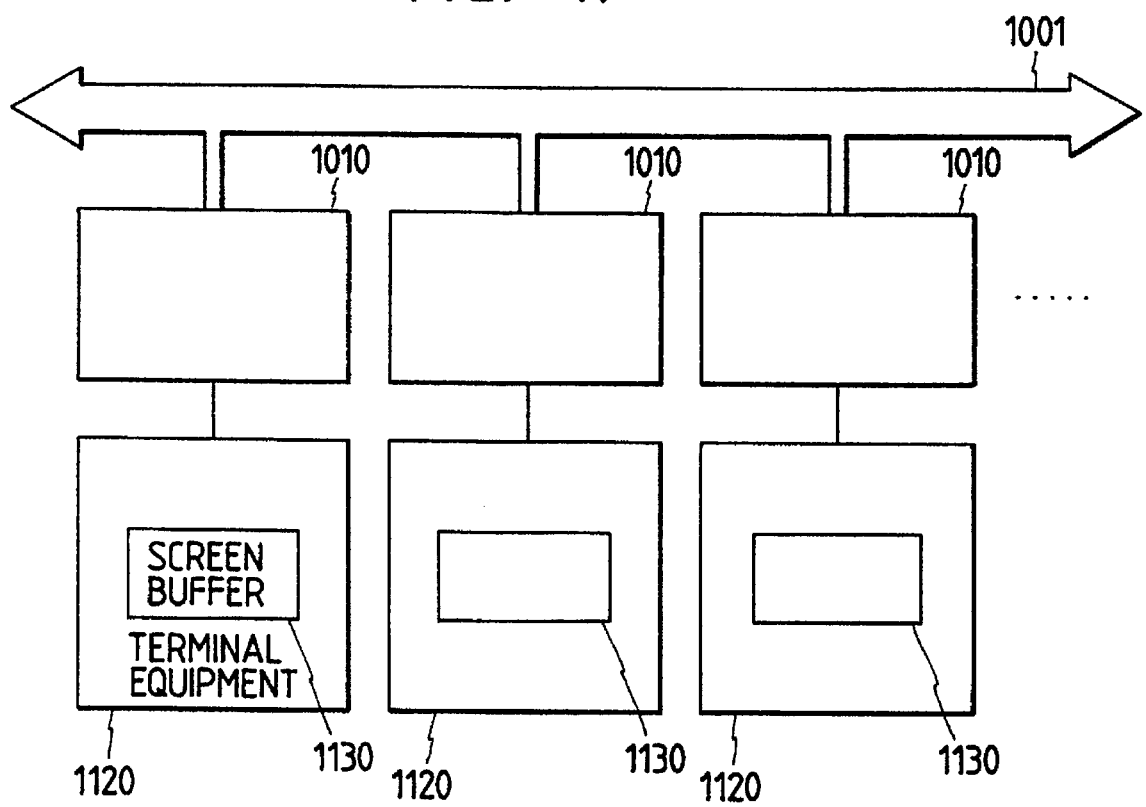
FIG. 17 is a block diagram of a multi-computer system of the fourth embodiment of the present invention.

The transmitting function of data for recovery and expansion 1117 of the processing unit 1107 creates, as shown in FIG. 16, a recovery and expansion supporting message 1200 according to records of a file (hereinafter called a recovery and expansion supporting file) 1031 which are read from the external storage device 1011, and transmits it to the transmission line 1005 as data for recovery and expansion 1002. The recovery and expansion supporting message 1200 has a content code 1202 indicating data for recovery and expansion 1002 and data 1206 comprising four types of information such as a file name, a content code meaning access to the file, a record, and a file event number indicating update information of the recovery and expansion supporting file 1031. The number of records is optional, and only one record can be provided. Therefore, records of the recovery and expansion supporting file 1031 are divided for each number of records to be contained in one data for recovery and expansion 1002 and transmitted sequentially starting at the No. 1 record.

The computer (hereinafter called a recovery and expansion processing computer) 1010 which transmits the recovery preparation completion message fetches the data for recovery and expansion 1002.

The receiving function of data for recovery and expansion 1445 accesses the recovery and expansion file 1041 on the fetched data in the addition mode. When a record of the same key is not found, it is written. When the record is found, nothing is done. Since the storage content deletion function 1443, as mentioned above, deletes the file, a record of the same key is not found in most cases, and it is written. However, when the record of the current data 1001 is already written as described next, it means that a record of the key exists, and it is not written. Thus, the current data 1001 takes precedence over the data for recovery and expansion 1002.

FIG. 16 shows as an example that immediately after the recovery and expansion supporting unit transmits the "m"th record 1311 as data for recovery and expansion 1002, the unit receives data for updating the "m+1"th record 1312 as current data 1001.

In the recovery and expansion supporting unit, the "m+1"th record 1312 is accessed and updated by the current data 1001 in the update mode, and the response message is returned to the update data source.

In the recovery and expansion processing unit, the "m"th record is accessed and added, that is, recovered by the data for recovery and expansion 1002 in the addition mode. Next, the "m+1"th record is accessed by the current data 1001 in the update mode. However, since the "m+1"th record is not found in the recovery and expansion processing file 1041, an access error is caused. If this occurs, the update/addition converting function 1432 converts the update mode to the addition mode so as to allow the "m+1"th record to be accessed once again. As a result, the "m+1"th record 1312 is added.

Then, the "m+1"th record is transmitted from the recovery and expansion supporting unit as data for recovery and expansion 1002, and the recovery and expansion processing file 1041 is accessed in the addition mode. Since the "m+1"th record, which is previously added by the current data 1001, exists in the recovery and expansion processing file 1041, an access error is caused, and the "m+1"th record, which is transmitted as data for recovery and expansion 1002, is canceled.

When data for updating the "m"th record 1311 as current data 1001 is received, it is accessed in the update mode. Therefore, the "m"th record is updated in either of the recovery and expansion supporting unit and the recovery and expansion processing unit.

Thus, the current data 1001 always takes precedence over the data for recovery and expansion 1002.

When the recovery and expansion supporting unit transmits the final record and the recovery and expansion processing unit adds or cancels the final record, a matching occurs among the multiplexed files.

The processing unit 1107 of the recovery and expansion processing unit returns the recovery flag 1404 for the file of the content code table 1108 to 0, and terminates the online storage content recovery and expansion processing.

In the above embodiment, a current data buffer for storing a certain amount of current data may be installed in the computer 1010 so that current data is stored in the current data buffer by the recovery and expansion processing unit during recovery, and the data of the current data buffer is fetched and updated on a first-in first-out basis when the current data buffer is full of data or all the data for recovery and expansion is processed. This current data buffer is different in the roll from the current data buffer described in the section of the prior art, and causes no unrecoverable problems due to an insufficient capacity.

In the above embodiment, a transmission method using a destination address instead of a content code may be used. In this case, the content code 1202 of the format of the message 1200 shown in FIG. 15 is replaced with a destination address, the computer 1010 shown in FIG. 13 has an address, and a message is received according to the destination address thereof. One of the computers 1010 has information on another computer 1010 which multiplexes a file which is managed by itself.

The file type is optional; that is, data bases can also be used. Files may be created not only in the external storage device 1011 but also in an internal storage device of each computer 1010.

The same may be said with storage contents of not only files but also, for example, screen buffers, other I/O device memories, or buffers.

FIG. 5 shows an embodiment using screen buffers.

In FIG. 5, the computers 1010 are connected to each other via the transmission line 1005, and transmit or receive data mutually. Each computer 1010 has terminal equipment 1120, and each terminal equipment 1120 has a screen buffer 1130.

During recovery and expansion of each terminal equipment 1120, the recovery and expansion supporting unit divides and transmits information of the screen buffer on the basis of the screen definition information. The recovery and expansion processing unit can recover and expand the screen buffer online in the same way as file recovery and expansion by allowing the current data to take precedence over the data for recovery and expansion.

Figure 18:
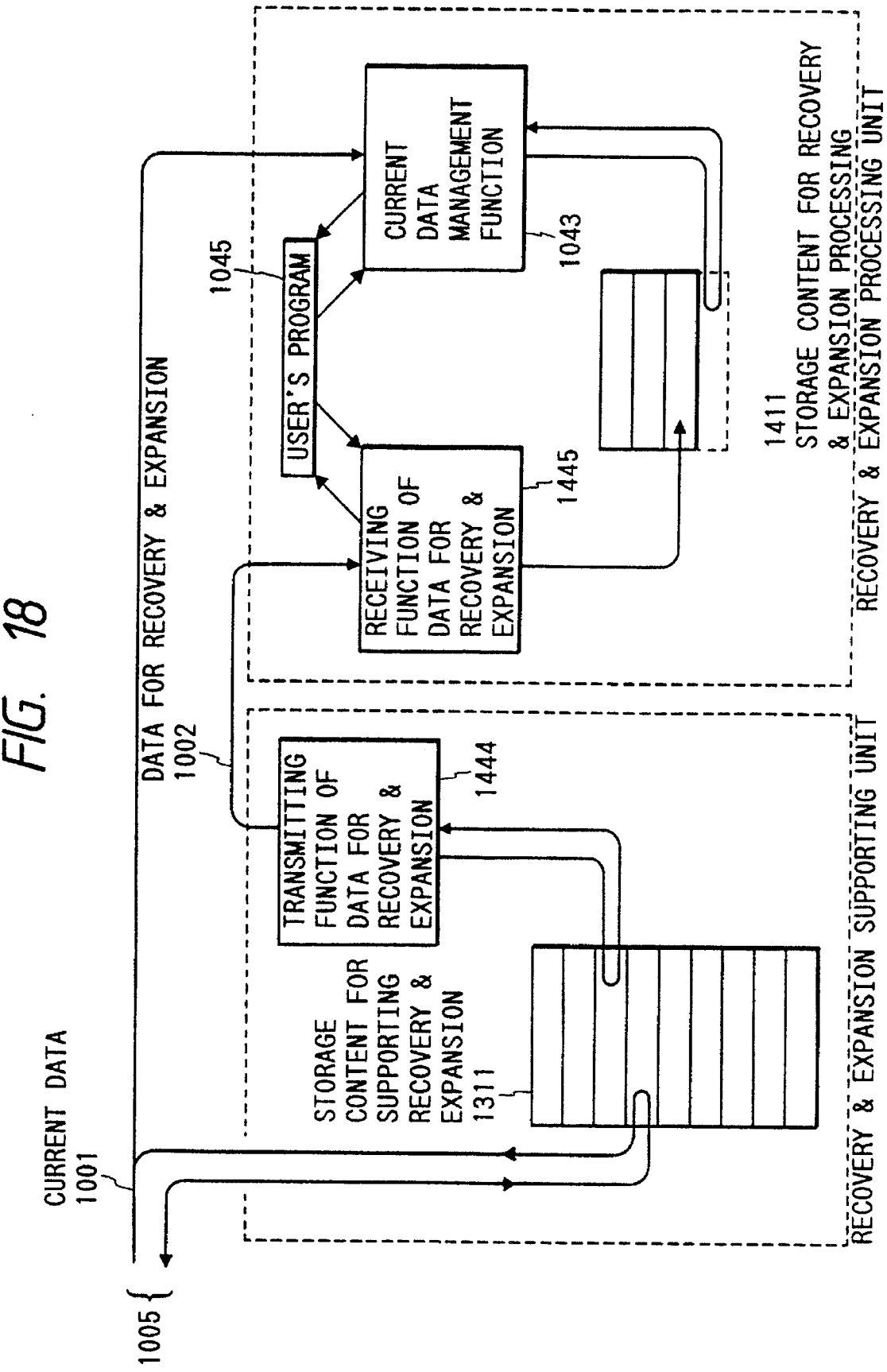
FIG. 18 is a block diagram of the data flow of the fifth embodiment of the present invention during recovery and expansion.

FIG. 18 shows a fourth embodiment of the present invention.

In this embodiment, the storage content for supporting recovery and expansion 1311 and the storage content for recovery and expansion processing 1411 may be different in content, type, or attribute from each other.

During recovery and expansion of the storage content for recovery and expansion processing 1411, the recovery and expansion supporting unit transmits the data for recovery and expansion 1002. The receiving function of data for recovery and expansion 1445 of the recovery and expansion processing unit which receives the data for recovery and expansion 1002 transfers the data for recovery and expansion 1002 to the user program 1045. The user program 1045 returns the processing result to the receiving function of data for recovery and expansion 1445. The current data management function 1043 transfers the current data 1001 to the user program 1044, and the processing result is returned to the current data management function 1043. The receiving function of data for recovery and expansion 1445 and the current data management function 1043 perform the recovery and expansion processing as described with reference to FIG. 16 on the basis of the returned result respectively.

In this embodiment, the storage content can be recovered and expanded under support of different storage contents of other computers 1010.

In the above embodiment of the present invention, since both the current data and the data for recovery and expansion are received and the storage content is recovered and expanded by matching them, there is no need of inhibiting the current data processing and the storage content can be recovered and expanded with the system non-stopped. A current data buffer with a large capacity for storing current data is not required, and the storage content can be recovered and expanded regardless of the capacity thereof.

Since recovery and expansion processing is decided on the basis of the storage content update information before starting recovery and expansion, the storage content which requires no recovery is not recovered uselessly.

Since each computer performs the self open processing, even if it starts after another computer does in a system in which the storage content is already open, the storage content can be accessed unless an error occurs.

We claim:

1. A method for transmitting data in a data processing system comprising:

providing a plurality of processors connected with a transmission medium, part of the plurality of processors having a transmission function using content codes indicating contents of data, and others of the plurality of processors having a transmission function using addresses of said plurality of processors;

producing, in a first processor, a message including transmission data, a content code indicating a content of said transmission data, and a group identifier which is a group address corresponding to partial physical addresses of a group of communicatable processors in the plurality of processors, communicatable with said first processor, the group of communicatable processors being less in number than the plurality of processors;

transmitting the produced message from the first processor to the transmission medium, in accordance with an event based occurrence;

storing the produced message in each of the communicatable processors;

deciding, in each of the communicatable processors, whether the data in the transmitted stored message is to be processed based on at least one of said content code and said group identifier included in the produced message, by consulting at least one of content codes and group identification previously stored in each of the communicatable processors; and, processing the stored transmitted message in any of the communicatable processors, when it is decided in said deciding step the message is to be processed.

2. A data transmission method according to claim 1, wherein said group identifier is an identifier indicating a group of data previously grouped based upon a processing purpose related to said content code.

3. The method according to claim 1 wherein the content codes are codes configured specifically for use in autonomous decentralized system communication.

4. A method for transmitting data in a network system comprising:

providing a plurality of multi-computer systems connected by communication lines via gateways, each of said multi-computer systems having a plurality of computers mutually connected through a transmission medium, a part of the plurality of computers of all the plurality of multi-computer systems having a transmission function using content codes indicating contents of data, and others of the computers of all the plurality of multi-computer systems having a transmission function using addresses of said computers;

producing in a first computer in one system of the multi-computer systems, a message including, transmission data, a content code indicating a content of the transmission data, and a group identifier which is a group address corresponding to partial physical addresses of a group of communicatable computers in the computers of all the plurality of multi-computer systems, communicatable with said first computer, the group of communicatable computers being less in number than the computers of all the plurality of multi-computer systems;

transmitting the produced message from the first computer to the transmission medium, in accordance with an event based occurrence;

deciding in a gateway corresponding to said first computer a destination gateway to send said message, according to at least one of said code and said group identifier included in the produced message, and sending said transmission data to the decided destination gateway; and, confirming in the destination gateway, whether at least one of the content code and said group identifier is previously registered in the destination gateway, and when confirmed as previously registered, transmitting said transmission data to the corresponding computer through said destination gateway, said group identifier being one of a set of group identifiers previously registered in the destination gateway.

5. The method according to claim 4 wherein the content codes are codes configured specifically for use in autonomous decentralized system communication.

6. A data transmission system comprising:

a plurality of processors connected with a transmission medium, part of the plurality of processors having a transmission function using content codes indicating contents of data, and others of the plurality of processors having a transmission function using addresses of said plurality of processors;

means for producing, in a first processor, a message including transmission data, a content code indicating a content of said transmission data, and a group identifier, which is a group address, corresponding to partial physical addresses of a group of communicatable processors in the plurality of processors, communicatable with said first processor;

means for transmitting the produced message from the first processor to the transmission medium, in accordance with an event based occurrence;

means for storing the produced message in each of the communicatable processors;

means for deciding, in each of the communicatable processors whether the data in the transmitted stored message is to be processed based upon at least one of said content code and said group identifier included in the produced message, by consulting at least one of content codes and group identifiers previously stored in each of the communicatable processors; and, means for processing the stored transmitted message in any of the communicatable processors, when it is decided, in said deciding means, the message is to be processed, the group of communicatable processors being less in number than the plurality of processors.

7. The data transmission system according to claim 6 wherein at least one of the plurality of processors have processing function means for processing messages which include content codes and group identifiers.

8. The data transmission system according to claim 7 wherein said at least one processor having processing function means for processing both messages including content codes and group identifiers further includes a delivery function means to distribute data to the processing function means dependent upon whether the message includes a content code or a group identifier.

9. A data transmission system comprising:

a plurality of multi-computer systems connected through communication paths via gateways, each of said multi-computer systems having a plurality of computers mutually connected through a transmission medium, part of the plurality of computers of all the plurality of multi-computer systems having a transmission function using content codes indicating contents of data, and others of the computers of all the plurality of multi-computer systems having a transmission function using addresses of said computers;

means for producing in a first computer in one system of the multi-computer systems, a message including, transmission data, a content code indicating a content of the transmission data, and a group identifier, which is a group address, corresponding to partial physical addresses of a group of communicatable computers of the computers of all the plurality of multi-computer systems, communicatable with said first computer, the group of communicatable computers being less in number than the plurality of the computers of the plurality of multi-computer systems;

means for transmitting the produced message from the first computer to the transmission medium, in accordance with an event based occurrence;

means for deciding in a gateway corresponding to said first computer, a destination gateway to send said message, according to at least one of said content code and said group identifier included in the produced message, and sending said transmission data to the decided destination gateway; and, means for confirming in the destination gateway, whether at least one of the content codes and said group identifier is previously registered in the destination gateway, and when confirmed as previously registered, transmitting said transmission data to the corresponding computer through said destination gateway, said group identifier being one of a set of group identifiers previously registered in the destination gateway.

* * * * *